(No Model.)
F. H. BERRY.
DENTAL ENGINE.
No. 489,117. Patented Jan. 3, 1893.
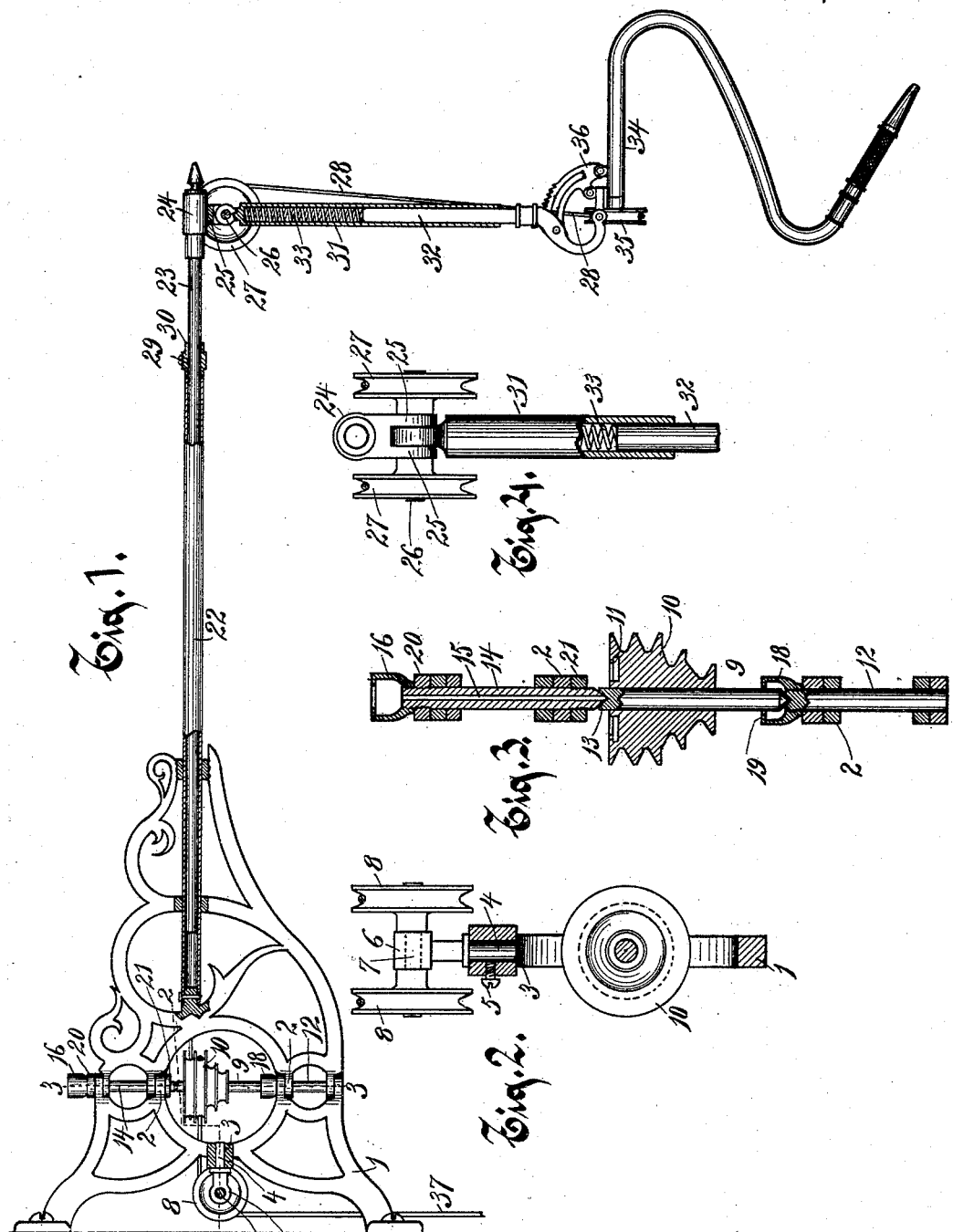

UNITED STATES PATENT OFFICE.

FREDERICK H. BERRY, OF MILWAUKEE, WISCONSIN.

DENTAL ENGINE.

SPECIFICATION forming part of Letters Patent No. 489,117, dated January 3, 1893.

Application filed July 25, 1892. Serial No. 441,112. (No model.)

*To all whom it may concern:*

Be it known that I, FREDERICK H. BERRY, of Milwaukee, in the county of Milwaukee and State of Wisconsin, have invented a new and useful Improvement in Brackets for Dental Engines, of which the following is a description, reference being had to the accompanying drawings, which are a part of this specification.
My invention has relation to improvements in brackets for suspension dental engines.

The objects had in view are, first, to provide an improved construction whereby the power belt may be connected in four different directions, and at the same time always maintain the same relation to the center, thus being prevented from twisting. Second, in the provision for the improved automatic regulation of the tension of the operating cord, it being necessary in the present makes of dental engines to adjust the same by hand. Finally, in the provision for various other objects as will hereinafter more fully appear.

The invention consists in the improved construction and combination of parts as hereinafter more fully set forth.

In the accompanying drawings forming a part of this specification and wherein similar numerals of reference designate similar parts throughout the several views, Figure 1, is a side elevation of the complete bracket, parts being shown in section to disclose the interior construction. Fig. 2, is a horizontal section on the line 2—2 of Fig. 1. Fig. 3, is a vertical section on the line 3—3 of said figure. Fig. 4, is a detail view of the swinging arm and its concomitant parts, part of the outer tubular casing of said arm being in section to illustrate the interior mechanism.
Referring to the drawings, the numeral 1, indicates the scroll bracket of the peculiar conformation shown in Fig. 1, and secured to any portion of the vertical wall of the room. This bracket is made of two sections hinged together at the points 2—2. The central ring of this bracket is provided at one point of its circumference with an aperture 3, which receives therein an arm 4, adjustable therein by means of a set screw 5, the outer end of said arm provided with an apertured head 6, which forms a bearing for a transverse shaft 7, carrying end pulleys 8, 8. It will be seen that both the stationary and hinged portions of the bracket are provided with curved semi-circular portions, which when the parts are brought together are made to register so as to form a complete circle.

The numeral 9 indicates a vertical shaft carrying a cone or speed pulley 10, which rotates within the circular portion of bracket 1. The upper surface of the cone pulley is provided with an annular cavity 11, having an overlapping confining flange. This cavity serves the function of a receptacle for waste oil. Shaft 9, has one end pointed and adapted to rotate in a registering socket of a bearing shaft 12, while the opposite end is provided with a conical socket 13, adapted to receive a correspondingly shaped end of a bearing shaft 14, which latter is provided throughout its length with an oil aperture 15. Both of these shafts 12 and 14 are suitably secured in the bracket, and the latter has its upper end screw threaded to receive the threaded end of an oil cup 16, which supplies oil through the aperture of said shaft and lubricates the contacting parts of shafts 14 and 9. At the point of contact of the lower end of shaft 9, the upper end of shaft 12 is screw threaded to receive an oil cup 18, provided with a confining flange 19, and supplying the lubricant directly to the contacting ends of the two shafts. As considerable wear occurs at the bearing points of these several shafts, I find it necessary to provide means for adjusting the same so as to compensate for such wear, and I have therefore provided shaft 14, immediately above the hinge joint, with a nut 20, working upon the upper threaded end of said shaft and the opposite threaded extremity of the shaft with a second nut, 21, immediately below the hinge joint at that point. Bracket 1 has projecting therefrom a tubular arm 22, which receives therein a sliding arm 23. The outer end of arm 23 is provided with a rigid collar 24, having the arms or bifurcations 25, 25, depending therefrom, which receive therebetween the upper end of a swinging arm, said arm turning upon a shaft 26, which has its bearings in the bifurcated parts 25, 25, and provided with end pulleys 27, 27, quartered with reference to the cone pulley 10, and over which an endless cord 28 from the speed or cone pulley passes. It will thus be seen that the swinging arm has a free forward and backward movement upon the shaft as a pivot and a free lateral movement by reason of the turning, in the tubular shaft or arm 22, of the sliding arm 23, while the position of said rocking arm closer to or farther away from the patient may be readily regulated by loosening a set screw 29 which works through a loose collar 30 and impinges against the shaft. When the screw is tightened the collar through which it passes acts as a stop and limits the inward movement of arm 23. This construction is useful, inasmuch as it permits rod 23 to be pulled out any desired distance to suit the position of the patient, after which the collar can be moved back upon the rod so as to contact with the end of tube 22, and thus prevent any movement of the rod inward, while at the same time said rod is still free to rotate within the tube.

In Fig. 1, of the drawings the collar 30 is shown as abutting against the end of tubular arm 22 to which position of course it is always brought no matter what may be its adjustment upon rod 23, by reason of the tension of the cord 28.

The swinging arm is formed of two sections, viz, an outer tubular part 31 and an inner rod 32. Within this tube is arranged a coiled spring 33, which bears upon the upper end of rod 32. As the lower end of this rod is connected to the rigid portion of the working arm 34, which latter carries the driven pulley 35, around which cord 28 finally passes, said cord is always automatically maintained taut, owing to the constant pressure exerted by the spring, and therefore all danger of looseness of the belt is guarded against.

The numeral 36 indicates a segmental ratchet by which the angle of the working arm is adjusted.

The numeral 37 indicates a cord which passes over pulleys 8, 8, and then around cone pulley 10. This cord is operated by any suitable means, not shown, and is the medium through which the cone pulley is rotated, and consequently the operating tool. It is, however, obvious that the pulleys 8, 8, may be dispensed with and the operating cord extended to the pulley from either side or forwardly or rearwardly, as best suits the position of the motor.

I also do not wish to be understood as restricting myself to the use of the three shafts 9, 12 and 14, as it will be readily understood that these can be dispensed with and one continuous shaft employed without departing from the spirit and scope of my invention, and if preferred, the shaft may be made stationary and the pulley alone revoluble.

An important advantage is gained by the peculiar form of bracket 1. It will be seen that it is so hinged as to operate around the perpendicular shaft 9, thereby not changing the tension of the belt in operating the tool in any direction, and permitting said tool to be moved from one chair to another and to be adapted for operation at either, this being attained by reason of the construction of the bracket, whereby the movable section thereof may be swung around the shaft and its pulley as a center, thus also making it possible to connect the power belt to the pulley either forwardly, rearwardly or from either side.

It is to be further noted that the longitudinal adjustment of arm 4 readily enables the taking up of any slack therein. Again it will be apparent that the rod 32 is not only adjustable longitudinally in the tube 31, but is also rotatable therein, whereby a complete universal joint movement of the tool is attained.

Having thus described my invention what I claim and desire to secure by Letters Patent of the United States is:

1. In a dental engine, the combination, of a bracket consisting of a stationary and a movable section, the latter having a hinge connection with the former, a shaft carrying a pulley and having its bearings in the bracket so that the movable section will describe a circle around the shaft and pulley as a center, an operating tool, connections between the same and the movable section of the bracket, pulleys connected with the operating tool and an endless cord passing around the pulley of the shaft and around the pulleys connected with the operating tool, substantially as set forth.

2. In a dental engine, the combination, of a bracket, a shaft mounted therein and carrying a cone pulley, a short shaft mounted adjustably in an aperture in the bracket, said shaft carrying end pulleys, an operating tool, a belt running from a source of power over the pulleys of the short shaft and then passing around the cone pulley, and a second belt passing from the cone pulley to the operating tool, substantially as set forth.

3. In a dental engine, the combination, of a forwardly-extending tubular swinging arm, a rod loose within the tube and rotatable and extensible therein said rod provided at its extremity with depending arms or bifurcated portions, a shaft journaled in said bifurcated portions and carrying pulleys upon its extended ends, a swinging arm turning upon the shaft, a working arm rigidly connected to the swinging arm and carrying a pulley, and an operating cord passing over the several pulleys, substantially as set forth.

4. In a dental engine, the combination of a forwardly extending tubular arm, a rod loose within said tube, an adjustable collar upon said rod, adapted for adjustment against the end of the tube upon the extension of the rod, to prevent the inward movement of said rod and permit of its rotation, a swinging arm secured to the rod, an operating tool, and an operating cord, substantially as set forth.

In testimony whereof I affix my signature in presence of two witnesses.

FREDERICK H. BERRY.

Witnesses:
ARTHUR L. MORSELL,
ANNA V. FAUST.